United States Patent
Hirono (10) Patent No.: US 9,646,183 B2
(45) Date of Patent: May 9, 2017

(54) READING APPARATUS AND READING METHOD

(71) Applicant: TOSHIBA TEC KABUSHIKI KAISHA, Shinagawa-ku, Tokyo (JP)

(72) Inventor: Masato Hirono, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/689,137

(22) Filed: Apr. 17, 2015

(65) Prior Publication Data
US 2015/0302228 A1 Oct. 22, 2015

(30) Foreign Application Priority Data
Apr. 18, 2014 (JP) .................. 2014-086785

(51) Int. Cl.
*G06K 7/00* (2006.01)
*G06K 7/10* (2006.01)
*G06Q 20/20* (2012.01)
*G07G 1/00* (2006.01)
*G06Q 10/08* (2012.01)
*H04W 4/00* (2009.01)

(52) U.S. Cl.
CPC ....... *G06K 7/10019* (2013.01); *G06Q 20/208* (2013.01); *G07G 1/0045* (2013.01); *G06K 7/10366* (2013.01); *G06Q 10/08* (2013.01); *G06Q 10/087* (2013.01); *H04W 4/008* (2013.01)

(58) Field of Classification Search
CPC ............... B65D 90/48; G06K 7/10366; G06K 7/10019; G06Q 10/08; G06Q 10/087; G06Q 20/208; H04W 4/008; G07G 1/0045

USPC .......................................... 235/439
See application file for complete search history.

(56) References Cited

U.S. PATENT DOCUMENTS 6,829,520 B1 * 12/2004 Green ............... G01K 3/04
                                                              235/385
7,518,511 B1 * 4/2009 Panja ............... G06Q 10/08
                                                        340/539.13
7,994,897 B2 * 8/2011 Azevedo ............ G06Q 10/087
                                                        235/375
(Continued)

FOREIGN PATENT DOCUMENTS

JP        2007-264918      10/2007

*Primary Examiner* — Claude J Brown
(74) *Attorney, Agent, or Firm* — Amin, Turocy & Watson LLP (57) ABSTRACT

A reading apparatus reading information from an RFID tag attached to a commodity configured to comprise: a casing consisting of an opening serving as an entrance and exit port of a commodity and a space for housing the commodity inside; an antenna configured to be arranged inside the space; an opening and closing lid configured to open and close the opening; an acquisition module configured to acquire an opening and closing state of the opening and closing lid; a reading module configured to execute, in a case in which the opening and closing state acquired by the acquisition module indicates a closing state of the opening and closing lid, a reading processing for reading information relating to commodities from RFID tags of each of the commodities housed in the casing through the antenna; and an output module configured to output the information read by the reading module.

6 Claims, 9 Drawing Sheets

(56) References Cited

U.S. PATENT DOCUMENTS

| | | | | |
|---|---|---|---|---|
| 8,095,435 B2* | 1/2012 | Newton | G06K 17/00 | 705/22 |
| 8,384,545 B2* | 2/2013 | Hussain | G06K 7/10178 | 312/209 |
| 8,659,395 B2* | 2/2014 | Kilian | G06K 7/0008 | 340/10.1 |
| 2006/0022827 A1* | 2/2006 | Higham | G08B 13/2417 | 340/572.1 |
| 2006/0208072 A1* | 9/2006 | Ku | G06K 7/0008 | 235/383 |
| 2006/0267730 A1* | 11/2006 | Steinke | G06K 7/0004 | 340/10.1 |
| 2007/0001809 A1* | 1/2007 | Kodukula | G06K 7/0008 | 340/10.1 |
| 2007/0108273 A1* | 5/2007 | Harper | G06Q 10/087 | 235/382 |
| 2007/0150381 A1* | 6/2007 | Pippia | F25D 29/00 | 705/28 |
| 2008/0015956 A1* | 1/2008 | Regard | A47F 9/042 | 705/28 |
| 2008/0088454 A1* | 4/2008 | Flores | G08B 13/2457 | 340/572.4 |
| 2008/0103939 A1* | 5/2008 | Gibb | G07F 11/002 | 705/28 |
| 2008/0116269 A1* | 5/2008 | Dearing | G06K 7/10336 | 235/385 |
| 2008/0224875 A1* | 9/2008 | Phillips | G06K 7/10316 | 340/572.8 |
| 2008/0283596 A1* | 11/2008 | Ishida | B65G 1/137 | 235/385 |
| 2009/0021345 A1* | 1/2009 | Sriharto | G08B 13/1427 | 340/5.6 |
| 2009/0091453 A1* | 4/2009 | Ishida | G06F 19/3462 | 340/572.1 |
| 2010/0017023 A1* | 1/2010 | Jacomet | G07F 11/54 | 700/236 |
| 2010/0252626 A1* | 10/2010 | Elizondo | G06Q 10/087 | 235/385 |
| 2013/0002443 A1* | 1/2013 | Breed | G01J 5/0846 | 340/686.1 |
| 2013/0126611 A1* | 5/2013 | Kangas | G06K 7/10178 | 235/385 |
| 2014/0046480 A1* | 2/2014 | Tanaka | B65G 43/08 | 700/225 |
| 2014/0138440 A1* | 5/2014 | D—Ambrosio | G06Q 50/22 | 235/385 |
| 2015/0029001 A1* | 1/2015 | Pleshek | H04W 4/008 | 340/10.5 |
| 2015/0127362 A1* | 5/2015 | DeBusk | G06F 19/328 | 705/2 |

* cited by examiner

READING APPARATUS AND READING METHOD

CROSS-REFERENCE TO RELATED APPLICATION

This application is based upon and claims the benefit of priority from Japanese Patent Application No. 2014-086785, filed Apr. 18, 2014, the entire contents of which are incorporated herein by reference.

FIELD

Embodiments described herein relate generally to a reading apparatus and a reading method.

BACKGROUND

Conventionally, there has been a commodity sales data processing apparatus which reads commodity information from an RFID tag (RFID chip) attached to each commodity, and carries out sales registration and checkout processing based on the commodity information. For example, there has been proposed a reading apparatus which collectively reads commodity information by placing a commodity or a shopping basket in which commodities are housed on a checkout counter in which a flat antenna is arranged.

In recent years, a commodity sales data processing apparatus (also referred to as a self-checkout apparatus, a self-checkout POS (Point Of Sales) apparatus or a self-registration apparatus) which is used to carry out sales registration and checkout processing of commodity by a customer himself/herself has appeared. In general, in such a self-checkout apparatus, the customer scans a code symbol attached to a commodity through a scanner to carry out a commodity sales registration.

Incidentally, in a case in which the reading apparatus which reads RFID tags is applied to the self-checkout apparatus, the customer reads the RFID tag by himself/herself. However, in the constitution of the conventional reading apparatus, since no explicit operation of the customer himself/herself is accompanied while the reading processing is started at the time of placing the shopping basket on the checkout counter, there is a problem that the customer is confused about the timing of beginning. Because a space where the reading of RFID tags is carried out by the flat antenna and a space where a customer and the like exist are continuous, there is a possibility that an operation such as taking out a commodity from the shopping basket or adding a commodity to the shopping basket during the reading process is carried out. In such cases, the reading apparatus probably cannot read the commodities in the shopping basket correctly, which may hinder the efficient processing.

DETAILED DESCRIPTION

In accordance with one embodiment, a reading apparatus, which reads information from an RFID tag attached to a commodity, configured to comprise a casing consisting of an opening serving as an entrance and exit port of a commodity and a space for housing the commodity inside; an antenna configured to be arranged inside the space; an opening and closing lid configured to open and close the opening; an acquisition module configured to acquire an opening and closing state of the opening and closing lid; a reading module configured to execute, in a case in which the opening and closing state acquired by the acquisition module indicates a closing state of the opening and closing lid, a reading processing for reading information relating to commodities from RFID tags of each of the commodities housed in the casing through the antenna; and an output module configured to output the information read by the reading module.

Figure 1:
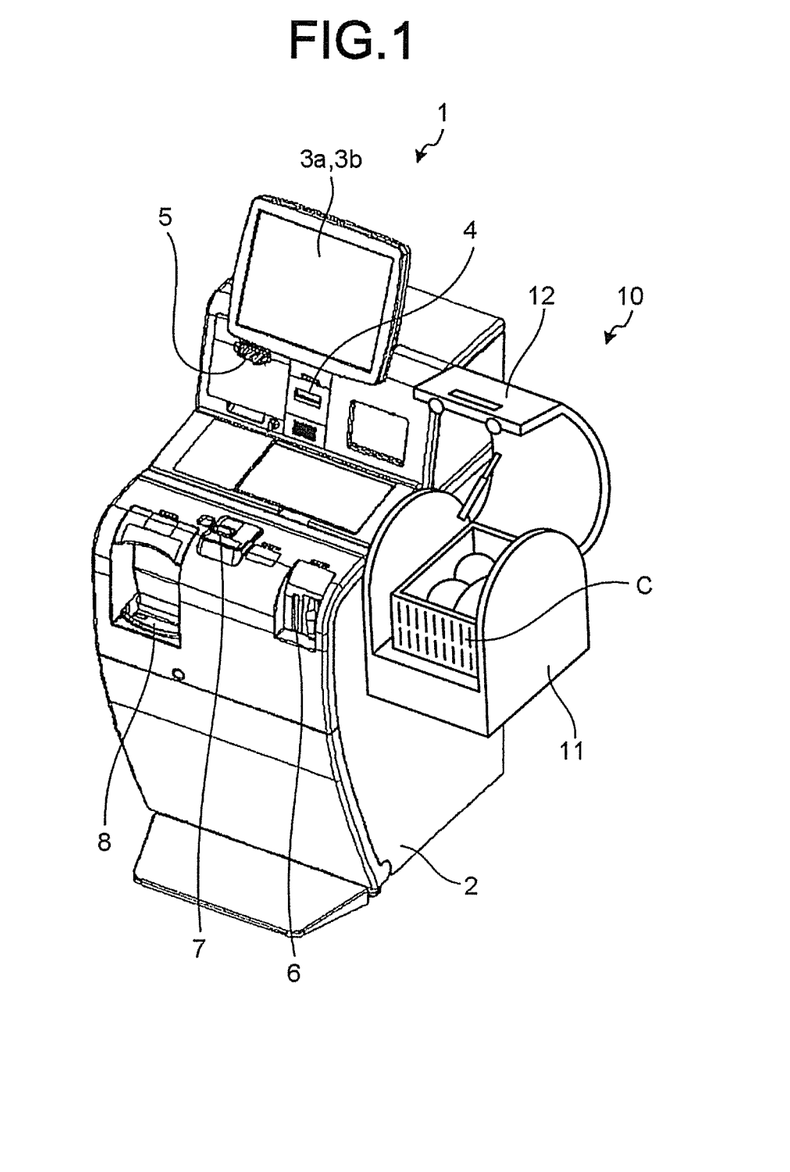
FIG. 1 is an external perspective view illustrating the constitution of a self-checkout apparatus according to one embodiment.

FIG. 1 is an external perspective view illustrating the constitution of a self-checkout apparatus 1 according to the present embodiment. The self-checkout apparatus 1 is a commodity sales data processing apparatus used to carry out sales registration and checkout processing of commodity by a customer himself/herself. The self-checkout apparatus 1 is arranged and used in a store such as a supermarket, a clothing store and the like. A main body 2 of the self-checkout apparatus 1 includes a display 3b on which a touch panel 3a is arranged on the surface thereof. For example, a liquid crystal display is used as the display 3b.

A card insertion port 4 and a receipt issuing port 5 are arranged in the main body 2 of the self-checkout apparatus 1. The card insertion port 4 is used for inserting the point card and credit card of the customer during the settlement process, and the receipt issuing port 5 is used for issuing a receipt. Further, a bill depositing/dispensing port 6 for carrying out depositing bill for settlement and receiving bill as change, a coin depositing port 7 for depositing coins at the time of settlement, a coin dispensing port 8 for receiving coin as change and the like are arranged in the main body 2.

A reading apparatus 10 for reading an RFID (Radio Frequency Identifier) tag T (refer to FIG. 3) attached to a commodity G is arranged at the right side of the main body 2. The reading apparatus 10, which is connected with the self-checkout apparatus 1 through cables (not shown), outputs (sends) various information read from the RFID tag T attached to the commodity G to the self-checkout apparatus 1. Herein, it is assumed that the RFID tag T in which a commodity code for identifying the commodity G and the like are recorded is attached to each commodity G. It is also assumed that a storage area for writing a registration completion flag that is described later is prepared in the RFID tag T. Such a registration completion flag is written to prevent the commodity G that has not been settled yet from being taken away from the store. Whether there is the registration completion flag or not is checked by, for example, the gates which are installed in the doorway of the store, and a warning is given through a notification module such as a buzzer and the like to a commodity on which there is no registration completion flag.

Figure 2:
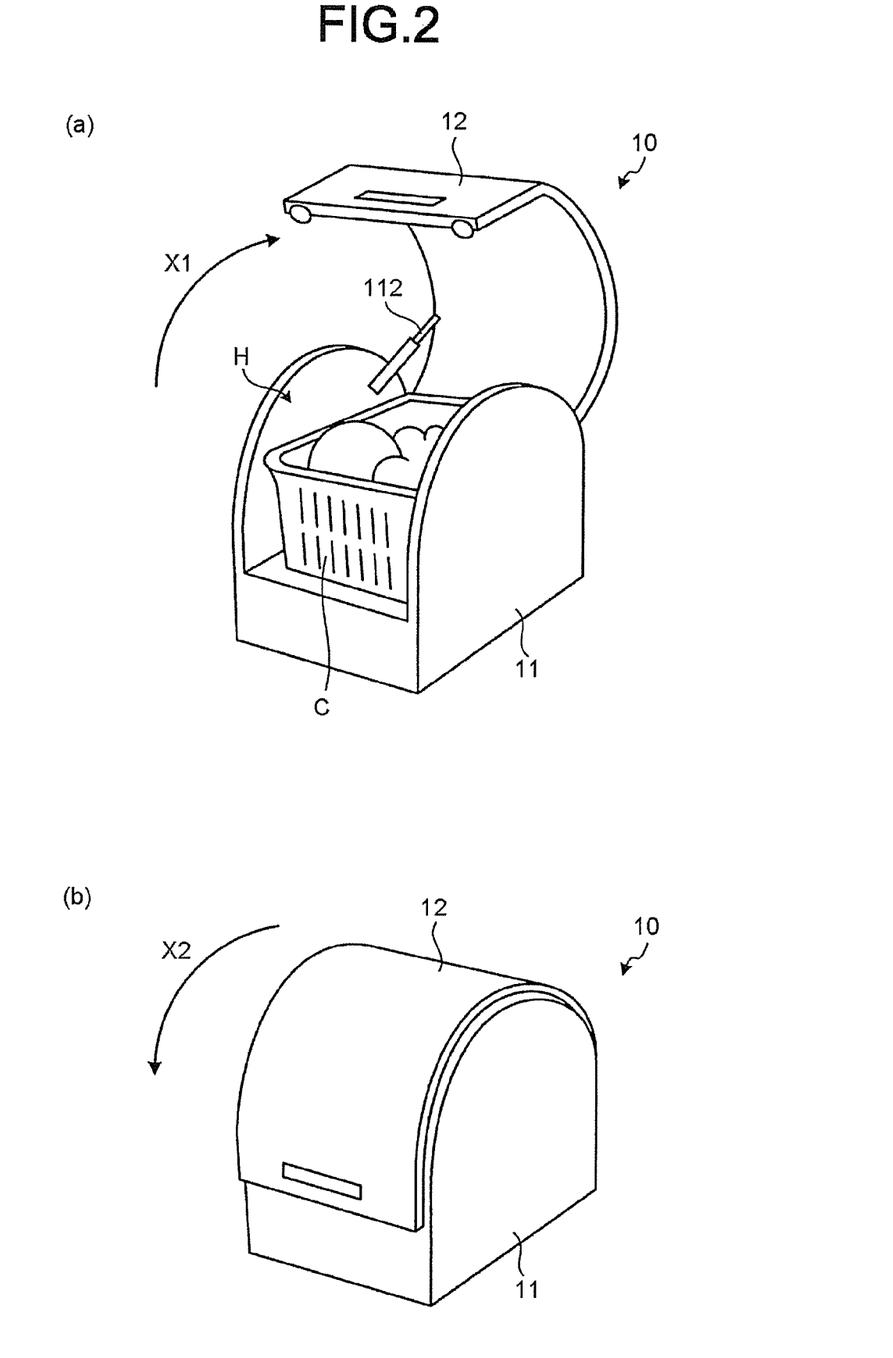
FIG. 2 is an external perspective view illustrating the schematic constitution of a reading apparatus according to the embodiment.
Figure 3:
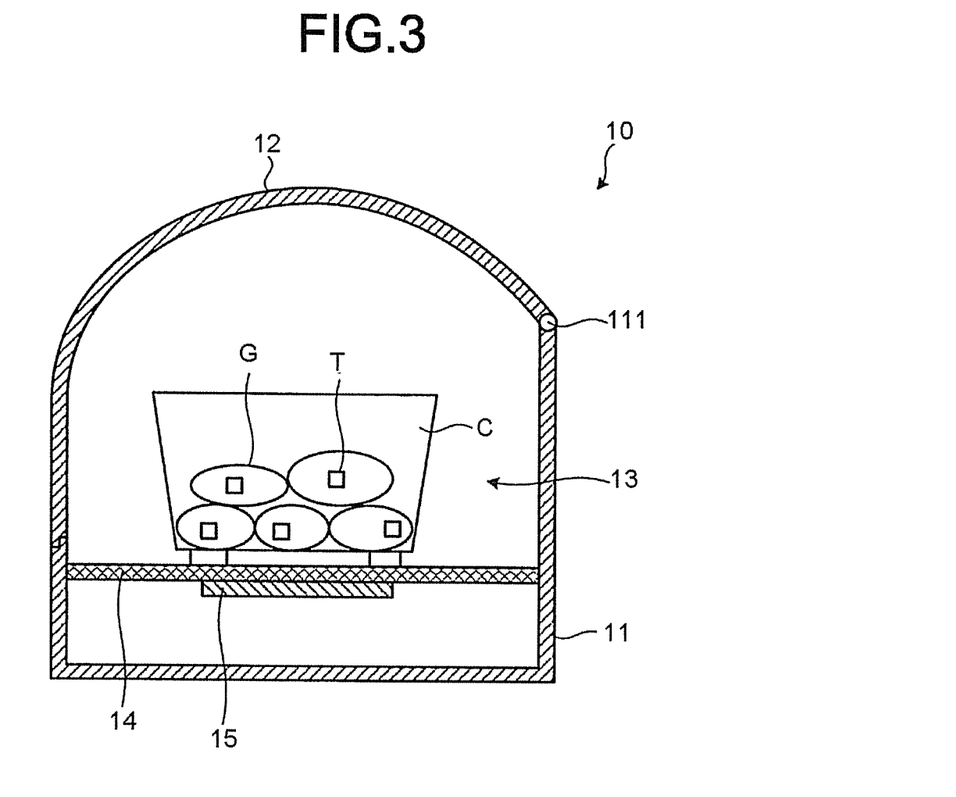
FIG. 3 is a schematic cross sectional view of the reading apparatus.

Hereinafter, the reading apparatus 10 is described. FIG. 2 is an external perspective view illustrating the schematic constitution of the reading apparatus 10. FIG. 2(a) illustrates the opening state in which an opening and closing lid 12 of the reading apparatus 10 is opened, and FIG. 2(b) illustrates a closing state in which the opening and closing lid 12 of the reading apparatus 10 is closed. Further, FIG. 3 is a schematic cross sectional view of the reading apparatus 10, and illustrates the closing state of the opening and closing lid 12.

The reading apparatus 10 includes a casing 11 constituting the main exterior of the reading apparatus 10 and the opening and closing lid 12 for opening and closing an opening H serving as an entrance and exit port of a shopping basket C (commodity G) arranged in the casing 11. The casing 11 is formed into a substantially box shape, and forms a proportion in which the size of the depth is larger than the size of the width and the length in the depth direction is long. The opening H has a size that is large enough to make the shopping basket C for housing the commodities G pass through. Further, the casing 11 includes a reading room 13 having a size capable of storing the shopping basket C inside.

To prevent the external radio wave from reaching the reading room 13, the casing 11 and the opening and closing lid 12 are formed by members which reflects radio waves (radio wave reflecting material) or members which absorbs radio wave (radio wave absorbing material). The relating members may use the well-known radio wave reflecting material or the radio wave absorbing material such as metal, mold material, ferrite and the like. In addition, for example, the outer wall (outer surface) of the casing 11 and the opening and closing lid 12 and the inner wall (inner surface) of the casing 11 and the opening and closing lid 12 for forming the reading room 13 may be covered by the radio wave reflecting material or the radio wave absorbing material.

The opening and closing lid 12 can be set to an opening state (FIG. 2(a)) by lifting it up in a direction indicated by an arrow X1 by taking a hinge mechanism 111 arranged at the backside of the casing 11 as a center. Further, the opening and closing lid 12 can be set to a closing state (FIG. 2(b)) by lifting it down in a direction indicated by an arrow X2 by taking the hinge mechanism 111 as a center. The customer sets the opening and closing lid 12 to the opening state so that the shopping basket C in which the commodity G is placed can be put into/take out from the reading room 13 of the casing 11 through the opening H of the casing 11. Further, a damper 112 may be arranged between the casing 11 and the opening and closing lid 12 to keep the opening state and the relaxation of the opening and closing speed of the opening and closing lid 12.

In the reading room 13, the shopping basket C is placed on a placing table 14. The placing table 14 is formed of a plate-like member having insulation (radio wave transmittance) such as wood, glass and the like, and is supported in such a manner that it has a predetermined gap with the casing 11. Further, a planar RFID antenna 15 is arranged at the side of a surface (hereinafter referred to as bottom surface) facing the placing surface of the shopping basket C on the placing table 14. The RFID antenna 15 emits the radio waves in UHF band and the like to carry out communication with the RFID tag T that exists in the reading room 13, that is, the RFID tag T of each commodity G housed in the shopping basket C (refer to FIG. 3). The number of the RFID antenna 15 is not limited to 1, and may be set to more than one. The method for arranging the RFID antenna 15 is not limited to the example described above, and the RFID antenna 15 may be arranged, for example, to be separate from the placing table 14. Further, the position of the RFID antenna 15 is not limited to be arranged at the bottom surface of the reading room 13 and the placing table 14, and it may also be arranged on other surfaces such as the lateral surface of the reading room 13.

According to the reading apparatus 10 with such a constitution, the shopping basket C is housed in the reading room 13, in this way, the commodities G (RFID tags T) in the shopping basket C can be collectively read. By isolating the reading room 13 where the RFID antenna 15 is read from the space where the customer exists, it is possible to prevent the illegal operations such as taking out the commodity G and adding the commodity G from being carried out during the reading process. Further, the outer surface of the reading apparatus 10 (the casing 11 and the opening and closing lid 12) is coated by the radio wave reflecting material and the radio wave absorbing material, in this way, the reading room 13 can be shielded from the external radio wave (noise), and thus it is possible to prevent occurrence of malfunction. In this way, the reading apparatus 10 is used to reduce the influence generated by the peripheral environment of self-device on the reading operation, and thus it is possible to perform the reading of the RFID tag T efficiently.

Figure 4:
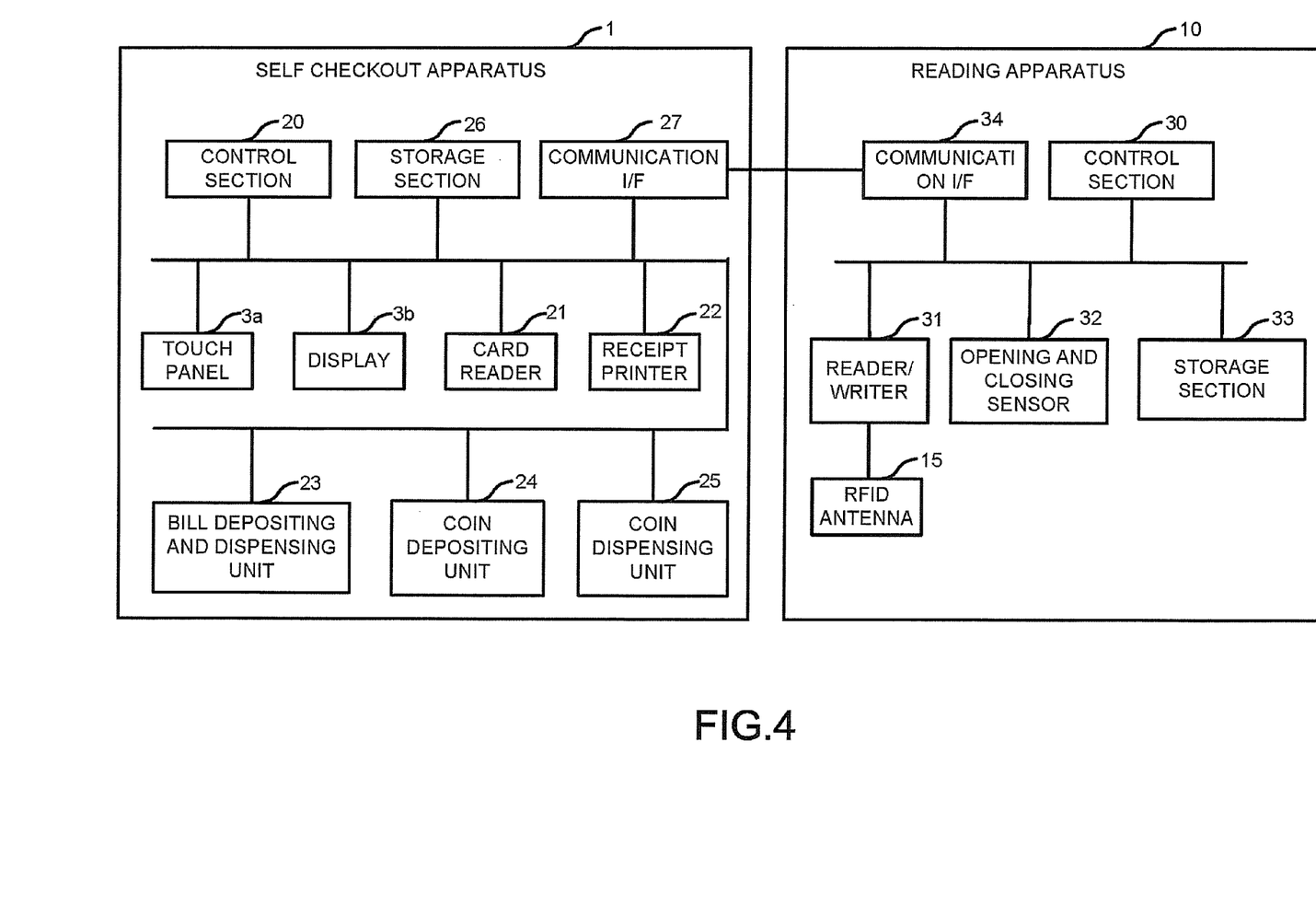
FIG. 4 is a block diagram illustrating the hardware constitutions of the self-checkout apparatus and the reading apparatus.

Next, the hardware constitutions of the self-checkout apparatus 1 and the reading apparatus 10 are described. FIG. 4 is a block diagram illustrating the hardware constitutions of the self-checkout apparatus 1 and the reading apparatus 10.

The self-checkout apparatus 1 includes a control section 20 constituted with a computer consisting of, for example, a CPU (Central Processing Unit), an ROM (Read Only Memory) and an RAM (Random Access Memory). The ROM stores various programs executed by the CPU and various data. The RAM stores programs and data temporarily when the CPU executes various programs.

The control section 20 is connected with the touch panel 3a, the display 3b, a card reader 21, a receipt printer 22, a bill depositing/dispensing unit 23, a coin depositing unit 24 and a coin dispensing unit 25 through various input/output circuits (none is shown).

The card reader 21 reads information of the point card and credit card of the customer inserted into the card insertion port 4. The receipt printer 22 prints a receipt after the checkout processing is completed to issue it from the receipt issuing port 5. The bill depositing/dispensing unit 23 processes the bills deposited or dispensed through the bill depositing/dispensing port 6. The coin depositing unit 24 processes the coins deposited through the coin depositing port 7. The coin dispensing unit 25 processes the coins dispensed through the coin dispensing port 8.

The control section 20 is further connected with a storage section 26 and a communication I/F 27 and the like through various input/output circuits (none is shown).

The storage section 26 is a storage device including a non-volatile storage medium such as an HDD (Hard Disk Drive), an SSD (Solid State Drive) and the like. The storage section 26 stores various programs and various data relating to operations of the self-checkout apparatus 1. As the data stored in the storage section 26, for example, a commodity master file in which the commodity information relating to each commodity G is registered in association with a commodity code for identifying the commodity G can be listed. The relating commodity information includes, for example the commodity name, price and the like of the corresponding commodity G. The communication I/F 27 is an interface for carrying out transmission/reception of various data with the reading apparatus 10.

On the other hand, the reading apparatus 10 includes a control section 30 constituted with a computer consisting of a CPU, an ROM, and an RAM. The ROM stores various programs executed by the CPU and various data. The RAM stores programs and data temporarily when the CPU executes various programs.

The control section 30 is further connected with a reader/writer 31, an opening and closing sensor 32, a storage section 33 and a communication I/F 34 through various input/output circuits (none is shown).

The reader/writer 31 uses the RFID antenna 15 to send modulation wave (radio wave) for reading and writing the RFID tag T. The reader/writer 31 outputs various information (for example, the commodity information and the like) read from the RFID tag T to the control section 30 through the RFID antenna 15. Further, the reader/writer 31 outputs the information (for example, the flag information and the like) to be written through the RFID antenna 15 to write the information into the RFID tag T.

The opening and closing sensor 32 is a sensor device for detecting the opening and closing state of the opening and closing lid 12. The opening and closing sensor 32 outputs opening and closing state information indicating the opening and closing state of the opening and closing lid 12 to the control section 30. The opening and closing sensor 32 may be realized by a connected part of the casing 11 and the opening and closing lid 12, or a micro-switch or a magnetic sensor arranged in the hinge mechanism 111 of the opening and closing lid 12. Further, in a case in which the reading room 13 becomes a dark place when the opening and closing lid 12 is in the closing state, the opening and closing sensor 32 may be realized by a photo-sensor arranged in the reading room 13.

The storage section 33 is a storage device including a non-volatile storage medium such as an HDD, an SSD and the like. The storage section 33 stores various programs and various data relating to operations of the reading apparatus 10. The communication I/F 34 is an interface for carrying out transmission/reception of various data with the self-checkout apparatus 1.

Next, the functional components of the self-checkout apparatus 1 and the reading apparatus 10 are described.

Figure 5:
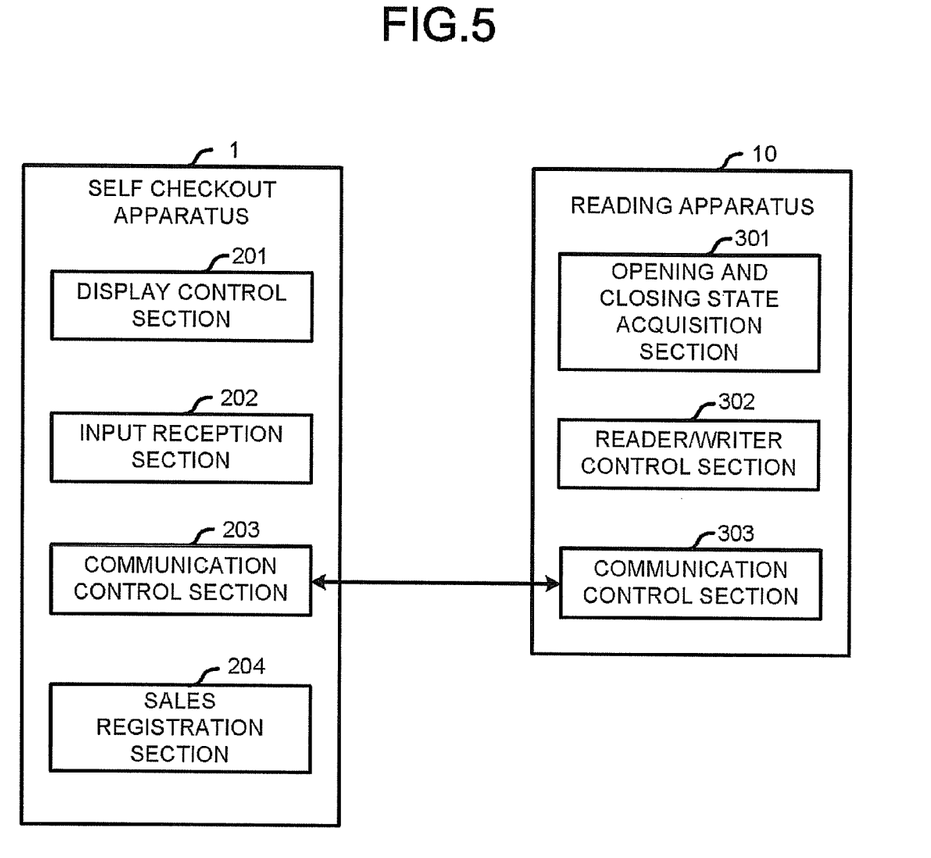
FIG. 5 is a block diagram illustrating functional components of the self-checkout apparatus and the reading apparatus.

FIG. 5 is a block diagram illustrating the functional components of the self-checkout apparatus 1 and the reading apparatus 10.

The control section 20 (CPU) of the self-checkout apparatus 1 cooperates with the programs stored in the storage section 26 to realize a display control section 201, an input reception section 202, a communication control section 203 and a sales registration section 204 as a function section.

The display control section 201 controls the display 3b to display various screens on the display 3b. For example, the display control section 201 displays a screen on which an operator for instructing the start of reading of the commodity code (RFID tag) (hereinafter referred to as reading start button) and an operator for instructing the reading ending (hereinafter referred to as reading ending button) are contained. The display control section 201 further reads, based on the commodity code sent from the reading apparatus 10, commodity information corresponding to the commodity code from the commodity master file to display the commodity name and price of the commodity G, the deposited amount and the change amount.

The input reception section 202 receives the operation input through the touch panel 3a. For example, the input reception section 202 outputs, in a case in which an operator is operated (touched) in the operation screen displayed on the display 3b, instruction information corresponding to the touched operator to the control section 20.

The communication control section 203 controls the communication I/F 27 to transmit/receive various kinds of information with the reading apparatus 10 through the communication I/F 27. For example, when the reading start button is operated, the communication control section 203 transmits the instruction information for instructing the reading start to the reading apparatus 10. The communication control section 203 further receives the commodity code sent from the reading apparatus 10. On the other hand, when the reading ending button is operated, the communication control section 203 transmits the instruction information for instructing the reading ending to the reading apparatus 10. In addition, when the sales registration by the sales registration section 204 is completed, the communication control section 203 transmits the instruction information for instructing registration completion to the reading apparatus 10.

If the payment of price is confirmed through the settlement processing for each commodity G corresponding to the commodity codes sent from the reading apparatus 10, the sales registration section 204 carries out sales registration by taking those commodity codes as the commodities G purchased by the customer. Specifically, the sales registration section 204 registers the commodity code of each commodity G in a database for registration, together with the deposited amount, the change and the transaction date and time. The database for registration may be arranged in the storage section 26 of the self-checkout apparatus 1, and may be arranged in an external device capable of communicating with the self-checkout apparatus 1.

On the other hand, the control section 30 (CPU) of the reading apparatus 10 cooperates the programs stored in the storage section 33 to realize an opening and closing state acquisition section 301, a reader/writer control section 302 and a communication control section 303 as a function section.

The opening and closing state acquisition section 301 acquires opening and closing state information indicating whether the opening and closing lid 12 is in the opening state or in the closing state by cooperating the opening and closing sensor 32.

The reader/writer control section 302 controls the reader/writer 31 to carry out the reading of the RFID tag T attached to the commodity G and to carry out the writing into the RFID tag T.

Specifically, in a case in which the reading start is instructed by the self-checkout apparatus 1 and the opening and closing state information acquired by the opening and closing state acquisition section 301 indicates the closing state of the opening and closing lid 12, the reader/writer control section 302 starts to read. In this way, since the reading of the commodity G is started when the customer closes the opening and closing lid 12, the customer can recognize the start timing of reading.

Further, if the reading ending is instructed by the self-checkout apparatus 1, the reader/writer control section 302 ends the reading of the reader/writer 31. Then, if the registration completion is instructed by the self-checkout apparatus 1, the reader/writer control section 302 controls the reader/writer 31 to start the writing of the registration completion flag. The registration completion flag is information indicating that the sales registration is completed, and is set to be written to a predetermined storage area in the RFID tag T.

Further, during a period from a time the reading of the RFID tag T is started to a time the registration completion flag is written, the reader/writer control section 302 ends the reading in a case in which the opening and closing lid 12 is in the opening state to execute a reset processing for resetting the commodity codes that have already been read so far. It is assumed that the commodity codes sent to the self-checkout apparatus 1 are also to be reset through the reset processing. Then, if it is determined that the opening and closing lid 12 is in the closing state again, the reader/writer control section 302 executes the reading of the RFID tag T again.

In this way, before the settlement processing is completed, even in a case in which the commodity G of which the RFID tag T has already been read is taken out from the shopping basket C (the reading room 13), or in a case in which the commodity G of which the RFID tag T has not been read yet is added to the shopping basket C, the commodities G in the shopping basket C can be read definitely. Further, by informing the self-checkout apparatus 1 that the opening and closing lid 12 is in the opening state, a screen for notifying that the opening and closing lid 12 is in the opening state may be displayed on the display 3b of the self-checkout apparatus 1.

The communication control section 303 controls the communication I/F 34 to transmit/receive various kinds of information with the self-checkout apparatus 1 through the communication I/F 34. For example, the communication control section 303 receives the instruction information for instructing the reading start sent from the self-checkout apparatus 1. The communication control section 303 further transmits the commodity code read from the RFID tag T by the reader/writer control section 302 to the self-checkout apparatus 1. The communication control section 303 further receives the instruction information for instructing the reading ending sent from the self-checkout apparatus 1. The communication control section 303 further receives the instruction information for instructing the registration completion sent from the self-checkout apparatus 1.

Figure 6:
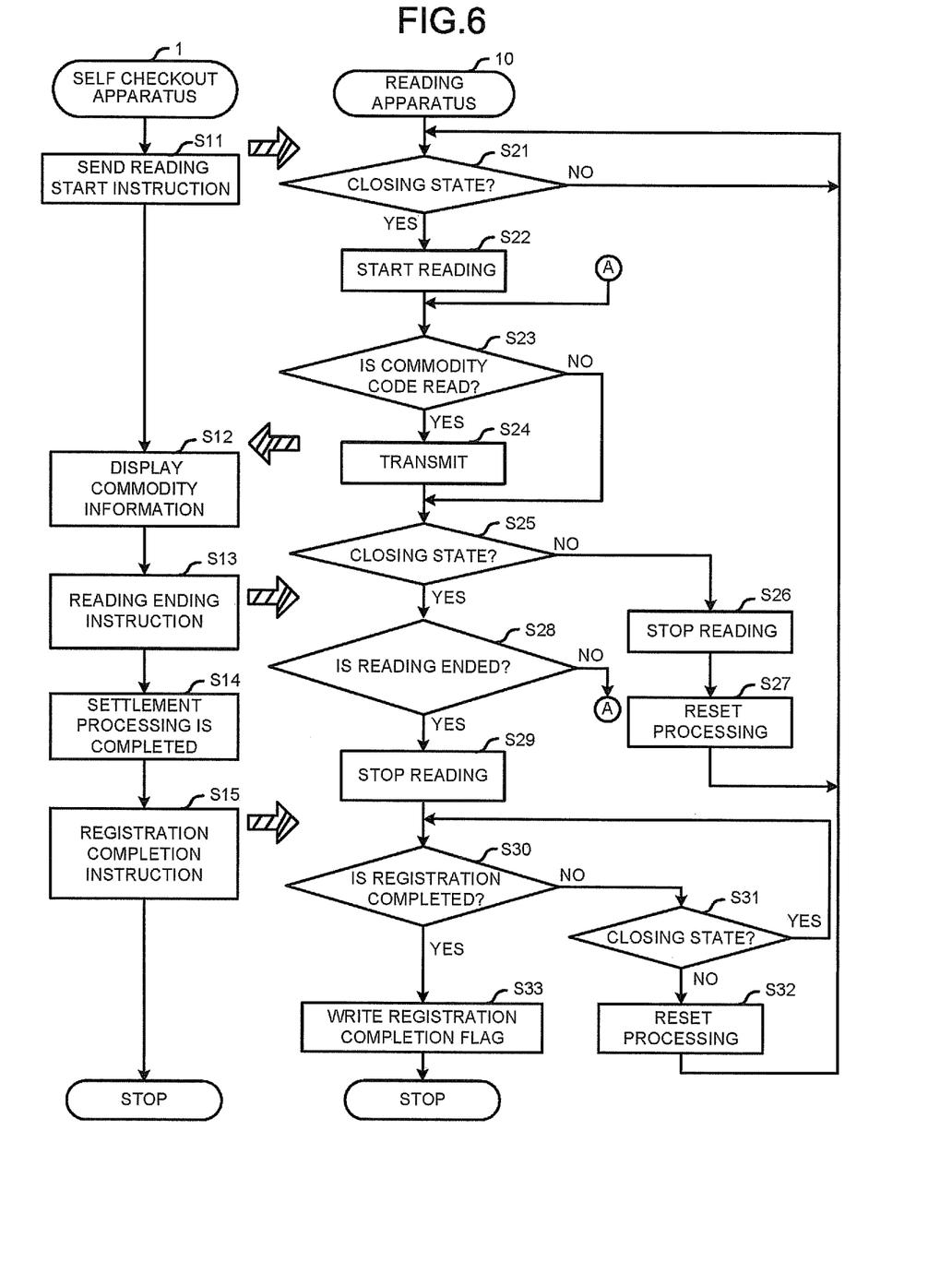
FIG. 6 is a flowchart illustrating an example of the operations of the self-checkout apparatus and the reading apparatus.

Further, the operations of the self-checkout apparatus 1 and the reading apparatus 10 are described. FIG. 6 is a flowchart illustrating an example of operations of the self-checkout apparatus 1 and the reading apparatus 10.

The customer who operates the self-checkout apparatus 1 opens the opening and closing lid 12 of the reading apparatus 10 to house the shopping basket C in which the commodities G are placed in the reading room 13. Next, the customer operates the reading start button displayed on the display 3b of the self-checkout apparatus 1, and thus the present processing is started.

In the self-checkout apparatus 1, if the input reception section 202 receives the operation of the reading start button, the communication control section 203 transmits instruction information for instructing reading start to the reading apparatus 10 (ACT S11).

In the reading apparatus 10, if the communication control section 303 receives the instruction information for instructing reading start, the reader/writer control section 302 determines whether or not the opening and closing lid 12 is in the closing state (ACT S21) based on the opening and closing state information acquired by the opening and closing state acquisition section 301. If it is determined that the opening and closing lid 12 is in the opening state, the reader/writer control section 302 waits for until the opening and closing lid 12 becomes the closing state (NO in ACT S21). Further, during the waiting in ACT S21, the reader/writer control section 302 cooperates with the display control section 201 of the self-checkout apparatus 1 to display a screen for urging to close the opening and closing lid 12.

In ACT S21, if it is determined that the opening and closing lid 12 is in the closing state (YES in ACT S21), the reader/writer control section 302 starts the reading of the RFID tag T (ACT S22). Next, the reader/writer 31 determines whether or not the commodity code is read from the RFID tag T (ACT S23). In a case in which the commodity codes cannot be read (NO in ACT S23), the processing is moved to ACT S25.

On the other hand, in a case in which the commodity codes can be read (YES in ACT S23), the communication control section 303 transmits the commodity codes to the self-checkout apparatus 1 sequentially (ACT S24), and the processing is moved to ACT S25.

Sequentially, in ACT S25, the reader/writer control section 302 determines whether or not the opening and closing lid 12 is in the closing state (ACT S25) based on the opening and closing state information acquired by the opening and closing state acquisition section 301. If it is determined that the opening and closing lid 12 is in the opening state (NO in ACT S25), the reader/writer control section 302 stops the reading of the RFID tag T (ACT S26). Then, the reader/writer control section 302 carries out a reset processing for resetting the commodity codes that have been read so far (ACT S27), and then the processing is returned to ACT S21 again.

Further, in ACT S25, if it is determined that the opening and closing lid 12 is in the closing state (YES in ACT S25), the reader/writer control section 302 determines whether or not the ending of reading is instructed by the self-checkout apparatus 1 (ACT S28). In a case in which there is no instruction of reading ending (NO in ACT S28), the processing is returned to ACT S23.

Further, in a case such as the reading of the RFID tag T is started in a state in which the reading room 13 is empty, any one of the RFID tags T cannot be read and a loop of "NO in ACT S23→YES in ACT S25→NO in ACT S28" is continued. Thus, in order to avoid such a state, the present embodiment may be set to forcibly terminate the reading of the RFID tag T in a case in which a given time (for example, 5 seconds) elapses or the loop described above has been executed for a given number of times while any one of the RFID tags T cannot be read. Further, in this case, it is preferable that the reader/writer control section 302 cooperates with the display control section 201 of the self-checkout apparatus 1 to display a message indicating that the RFID tag T cannot be read.

In the self-checkout apparatus 1, if the communication control section 203 receives the commodity code from the reading apparatus 10, the display control section 201 reads out the commodity information corresponding to the commodity code from the commodity master file to display it on the display 3b (ACT S12).

If the customer confirms that all commodities G placed in the shopping basket C are displayed with reference to the commodity information displayed on the display 3b, the customer operates the reading ending button displayed on the display 3b. Then, if the input reception section 202 receives the operation of the reading ending button, the communication control section 203 transmits the instruction information for instructing the reading ending to the reading apparatus 10 (ACT S13).

In the reading apparatus 10, if the communication control section 303 receives the instruction information for instructing the reading ending, the read/writer control section 302 determines that the ending of reading is instructed (YES in ACT S28). Sequentially, the reader/writer control section 302 stops the reading of the RFID tag T (ACT S29).

Then, the reader/writer control section 302 determines whether or not the registration completion is instructed by the self-checkout apparatus 1 (ACT S30). In a case in which there is no instruction of registration completion (NO in ACT S30), the reader/writer control section 302 determines whether or not the opening and closing lid 12 is in the closing state based on the opening and closing state acquired by the opening and closing state acquisition section 301 (ACT S31).

If it is determined to be in the closing state (YES in ACT S31), the processing is returned to ACT S30. On the other hand, if it is determined to be in the opening state (NO in ACT S31), the reader/control section 302 carries out a reset processing identical to that in ACT S27 (ACT S32), and then the processing is returned to ACT S21 again.

In the self-checkout apparatus 1, if the settlement processing for each commodity G displayed as the registration candidate is completed (ACT S14), the sales registration section 204 carries out sales registration of these commodities G. Then, the communication control section 203 transmits the instruction information for instructing the sales completion to the reading apparatus 10 (ACT S15), and then the processing is terminated.

In the reading apparatus 10, if the communication control section 303 receives the instruction information for instructing the registration completion, the reader/writer control section 302 determines that the registration completion is instructed (YES in ACT S30). Then, the reader/writer control section 302 controls the reader/writer 31 to write the registration completion flag in the RFID tag T of each commodity G (ACT S33), and then the present processing is ended.

At the time of writing the registration completion flag, the reader/writer control section 302 may cooperate with the display control section 201 of the self-checkout apparatus 1 to display a screen for transmitting that to remain the closing state of the opening and closing lid 12. Further, in a case in which the writing of the registration completion flag is ended, the reader/writer control section 302 may cooperate with the display control section 201 of the self-checkout apparatus 1 to display a screen for urging to open the opening and closing lid 12.

As stated above, in accordance with the reading apparatus 10 of the present embodiment, the shopping basket C in which the commodities G are placed is housed in the reading room 13 and the opening and closing lid 12 is set to the closing state, in this way, the reading of the RFID tag T attached to each commodity G can be collectively carried out in a state in which the reading room 13 is separated from the space where the customer exists. In this way, it is possible to carryout reading operation in a state in which the influence generated by the peripheral environment of self-device on the self-device is reduced, as a result, the reading of the REID tag T can be carried out efficiently.

Further, in accordance with the reading apparatus 10 of the present embodiment, since the reading of the commodities G is started together with the closing state of the opening and closing lid 12, the customer can recognize the timing of start of reading. As a result, it is possible to prevent the customer from carrying out illegal operations such as taking out a commodity G accidentally, and thus the reading of the RFID tag T can be carried out efficiently. Further, in accordance with the reading apparatus 10 of the present embodiment, during the period from the time the reading is started to the time the registration completion flag is written, the reading can be carried out again by executing the reset processing in a case in which the opening and closing lid 12 is in the opening state. In this way, even in a case in which a commodity G is taken out or in a case in which a commodity G is added before the settlement processing is completed, the commodities G in the shopping basket C can be read definitely, and thus the reading of the RFID tag T can be carried out efficiently.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, it is exemplified in the embodiment described above that the reading of the RFID tag T is started in response to the operation instruction from the customer. However, the present invention is not limited to this. As other forms, for example, the reading of the RFID tag T may be started automatically by interlocking with that the opening and closing lid 12 is switched to the closing state without the operation instruction from the customer.

Further, it is exemplified in the embodiment described above that the reset processing is executed after the reading is ended in a case in which the opening and closing lid 12 is in the opening state during the period from the time the reading of the RFID tag T is started to the time the registration completion flag is written. However, the present invention is not limited to this. As other forms, for example, a lock mechanism for maintaining (locking) the closing state of the opening and closing lid 12 may be arranged in the connected part of the casing 11 with the opening and closing lid 12 of the reading apparatus 10 so that the opening and closing lid 12 cannot be opened. Specifically, during the period from the time the reading of the RFID tag T is started to the time the registration completion flag is written, the reader/writer control section 302 controls the lock mechanism to maintain the closing state in such a manner that the opening and closing lid 12 cannot be opened. In this way, before the settlement processing is completed, it is possible to prevent that the commodity G of which the RFID tag T has already been read is taken out from the shopping basket C (the reading room 13) and the commodity G of which the RFID tag T has not been read yet is added to the shopping basket C.

Further, it is exemplified in the embodiment described above that the reading of the RFID tag T is ended in response to the ending instruction from the customer. However, the present invention is not limited to this. As other forms, for example, the reading may be ended automatically if the RFID tags T corresponding to the quantity (number of commodity) instructed by the customer are read.

Further, it is exemplified in the embodiment described above that the opening and closing lid 12 is set to an upper lid type in the reading apparatus 10. However, the present invention is not limited to this, and it may adopt other type. Hereinafter, the reading apparatus 10 that adopts other types are described as modifications.

(Modification 1)

Figure 7:
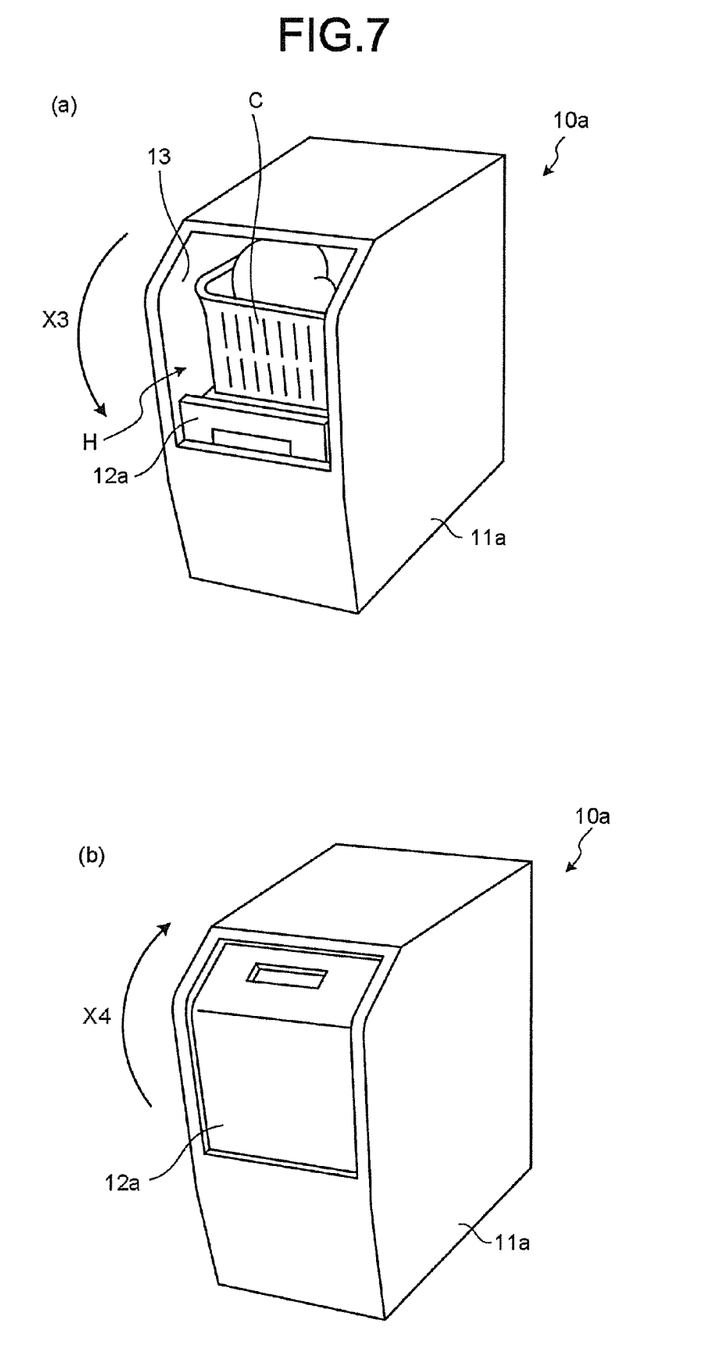
FIG. 7 is an external perspective view illustrating the schematic constitution of a reading apparatus according to modification 1.

FIG. 7 is the external perspective view illustrating the schematic constitution of a reading apparatus 10a according to modification 1. FIG. 7(*a*) illustrates an opening state in which an opening and closing lid 12a of the reading apparatus 10a is opened, and FIG. 7(*b*) illustrates a closing state in which the opening and closing lid 12a of the reading apparatus 10a is closed.

The opening and closing lid 12a is arranged in such a manner that the opening H arranged in a substantially box-shaped casing 11a can be covered. The opening and closing lid 12a, which is a shutter constituted by connecting a plurality of slats, is slidably supported along two edge walls of the opening H. In the examples shown in FIG. 7, the opening and closing lid 12a can be set to opening state by lifting it down in a direction indicated by an arrow X3 (FIG. 7(*a*)). Further, the opening and closing lid 12a can be set to closing state by lifting it up in a direction indicated by an arrow X4 (FIG. 7(*b*)).

The casing 11a and the opening and closing lid 12a are formed by the radio wave reflecting material or the radio wave absorbing material to prevent that the external radio wave reaches the inside of the reading room 13. For example, the outer wall (outer surface) of the casing 11a and the opening and closing lid 12a and the inner wall (inner surface) of the casing 11a and the opening and closing lid 12a for surrounding the reading room 13 may be covered by the radio wave reflecting material or the radio wave absorbing material.

In this way, similar to the embodiment described above, the influence generated by the peripheral environment of the self-device on the reading operation can be reduced, and thus the reading of the RFID tag T can be carried out efficiently. Further, the opening and closing direction and the shape of the opening and closing lid 12a are not limited to the examples shown in FIG. 7.

(Modification 2)

Figure 8:
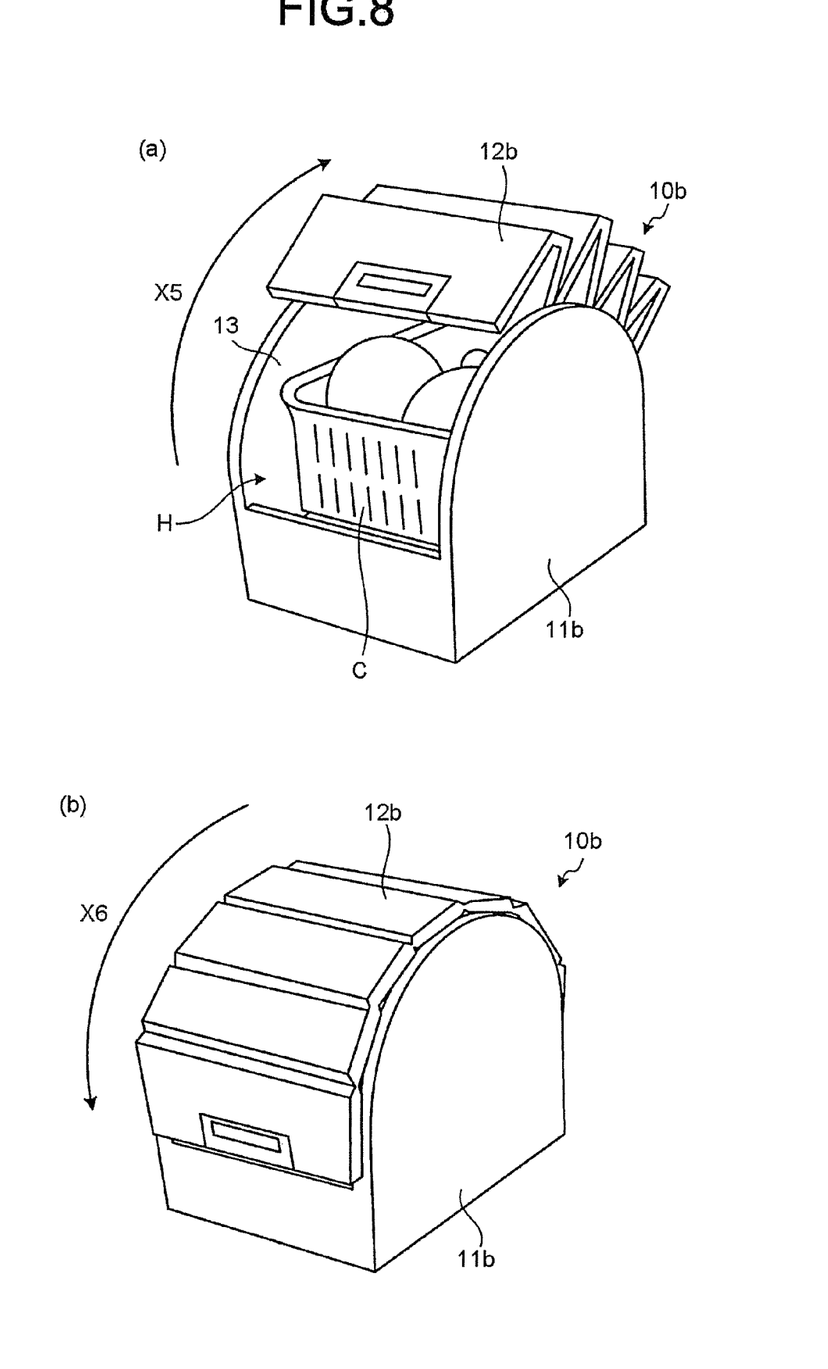
FIG. 8 is an external perspective view illustrating the schematic constitution of a reading apparatus according to modification 2.

FIG. 8 is the external perspective view illustrating the schematic constitution of a reading apparatus 10b according to modification 2. FIG. 8(*a*) illustrates an opening state in which an opening and closing lid 12b of the reading apparatus 10b is opened, and FIG. 8(*b*) illustrates a closing state in which the opening and closing lid 12b of the reading apparatus 10b is closed.

The opening and closing lid 12b is arranged in such a manner that the opening H arranged in a substantially box-shaped casing 11b can be covered. The opening and closing lid 12b, which is a folded opening and closing lid that can be folded like the belly of a snake, is slidably supported along two edge walls of the opening H. In the examples shown in FIG. 8, the opening and closing lid 12b can be set to opening state by lifting it up in a direction indicated by an arrow X5 (FIG. 8(*a*)). Further, the opening and closing lid 12b can be set to closing state by lifting it down in a direction indicated by an arrow X6 (FIG. 8(*b*)).

The casing 11b and the opening and closing lid 12b are formed by the radio wave reflecting material or the radio wave absorbing material to prevent that the external radio wave reaches the inside of the reading room 13. For example, the outer wall (outer surface) of the casing 11b and the opening and closing lid 12b and the inner wall (inner surface) of the casing 11b and the opening and closing lid 12b for forming the reading room 13 may be covered by the radio wave reflecting material or the radio wave absorbing material.

In this way, similar to the embodiment described above, the influence generated by the peripheral environment of the self-device on the reading operation can be reduced, and thus the reading of the RFID tag T can be carried out efficiently. Further, the opening and closing direction and the shape of the opening and closing lid 12b are not limited to the examples shown in FIG. 8.

(Modification 3)

Figure 9:
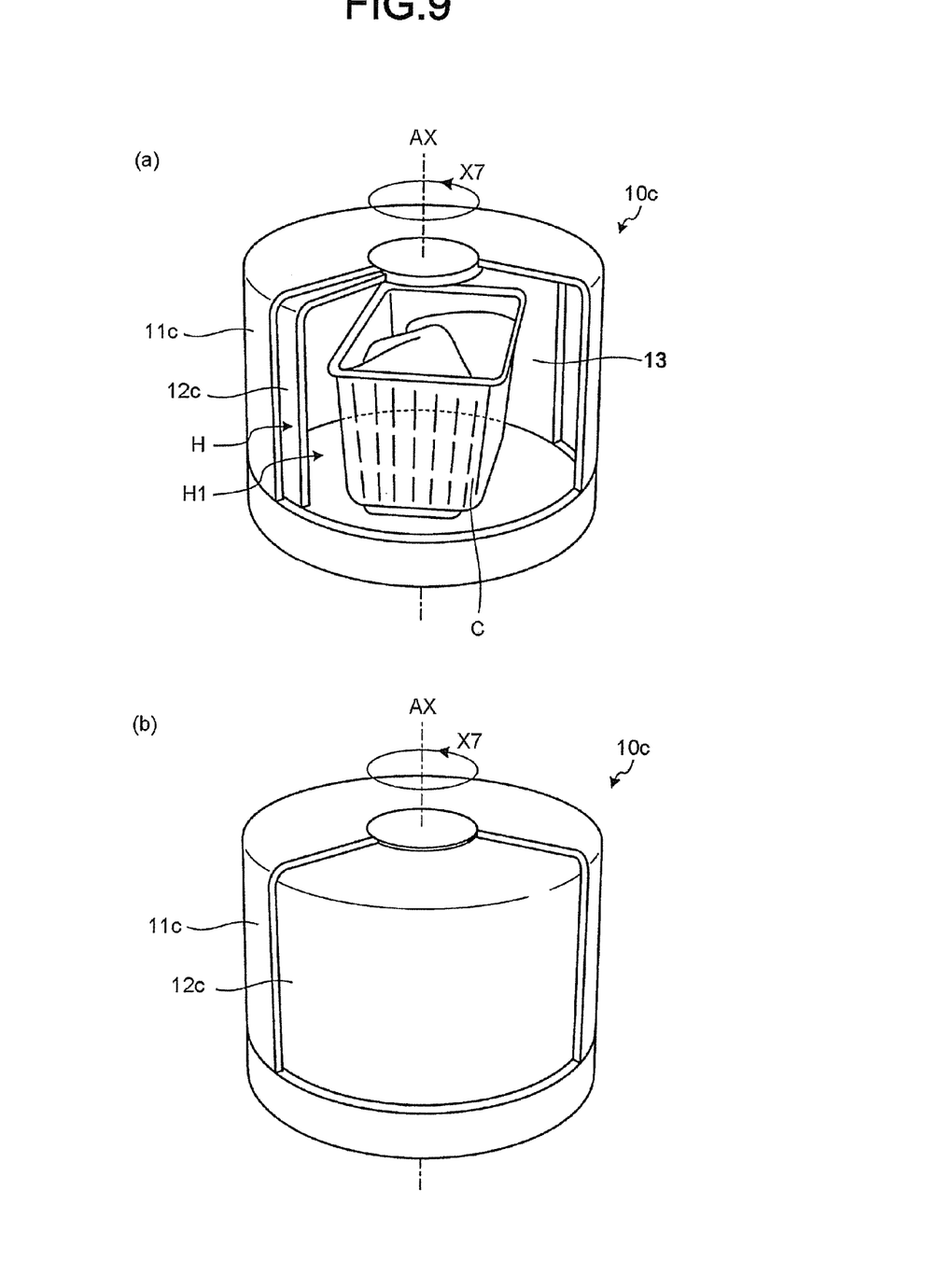
FIG. 9 is an external perspective view illustrating the schematic constitution of a reading apparatus according to modification 3.

FIG. 9 is the external perspective view illustrating the schematic constitution of a reading apparatus 10c according to modification 3. FIG. 9(*a*) illustrates an opening state in which an opening and closing lid 12c of the reading apparatus 10c is opened, and FIG. 9(*b*) illustrates a closing state in which the opening and closing lid 12c of the reading apparatus 10c is closed.

The opening and closing lid 12c is arranged in such a manner that the opening H arranged in a cylindrical casing 11c can be covered. The opening and closing lid 12c is a substantially cylindrical structure which is constituted by taking an axe AX as a center and rotatable in a direction indicated by an arrow X7, and an opening H1 having a size corresponding to the opening H of the casing 11c is arranged in the lateral surface of the opening and closing lid 12c. In the examples shown in FIG. 9, the opening and closing lid 12c can be set to opening state in a case in which the opening H of the casing 11c overlaps with the opening H1 of the opening and closing lid 12c through the rotation towards the direction indicated by the arrow X7 (FIG. 9(*a*)). Further, the opening and closing lid 12c can be set to closing state in a case in which the opening H of the casing 11c doesn't overlap with the opening H1 of the opening and closing lid 12c (FIG. 9(*b*)). In addition, the bottom surface of the opening and closing lid 12c and the placing table 14 described above may be arranged integrally to enable the shopping basket C to rotate with the rotation of the opening and closing lid 12c.

The rotation of the opening and closing lid 12c may be carried out manually, and may be automatically carried out in response to the instruction of reading start and the like. In a case of carrying out the rotation automatically, the reader/writer control section 302 may control to carry out the reading of the RFID tag T at the time the opening and closing lid 12c is in the closing state. Further, the reader/writer control section 302 may control to end the reading of the RFID tag T if the opening and closing lid 12c rotates a predetermined number of times (e.g., one round).

The casing 11c and the opening and closing lid 12c are formed by the radio wave reflecting material or the radio wave absorbing material to prevent that the external radio wave reaches the inside of the reading room 13. For example, the outer wall (outer surface) of the casing 11c and the opening and closing lid 12c and the inner wall (inner surface) of the casing 11c and the opening and closing lid 12c for surrounding the reading room 13 may be covered by the radio wave reflecting material or the radio wave absorbing material.

In this way, similar to the embodiment described above, the influence generated by the peripheral environment of the self-device on the reading operation can be reduced, and thus the reading of the RFID tag T can be carried out efficiently.

In addition to the types in modifications 1~3 described above, the opening and closing lid 12 may be, for example, a drawer-type one or a door-type one such as double doors and the like. Further, no matter what type it is, it is assumed that the casing 11 and the opening and closing lid 12 are formed by radio wave reflecting material or the radio wave absorbing material.

Further, in the embodiment above, the programs executed by each apparatus are pre-incorporated in the storage medium (ROM or storage section) of each apparatus, however, the present invention is not limited to this, the programs may be recorded in a computer-readable recording medium such as CD-ROM, flexible disk (FD), CD-R, DVD (Digital Versatile Disk) in the form of installable or executable file. Further, the storage medium, which is not limited to a medium independent from a computer or an incorporated system, further includes a storage medium for storing or temporarily storing the downloaded program transferred via an LAN or the Internet.

Further, in the embodiment described above, the programs executed by each apparatus may be stored in a computer connected with a network such as the Internet, and downloaded via the network, or may be provided or distributed via a network such as the Internet.

What is claimed is:

1. A reading apparatus for reading information from an RFID tag attached to a commodity, comprising:
    a casing including an opening serving as an entrance and exit port of a commodity and a space for housing the commodity inside;
    an antenna configured to be arranged inside the space;
    an opening and closing lid configured to open and close the opening;
    an acquisition module configured to acquire an opening and closing state of the opening and closing lid;
    a reading module configured to execute, in a case in which the opening and closing state acquired by the acquisition module indicates a closing state of the opening and closing lid, a reading processing for reading information relating to the commodity from the RFID tag of the commodity housed in the casing through the antenna; and
    an output module configured to output the information read by the reading module to a registration apparatus, wherein
    the reading module resets, in a case in which a state of the opening and closing lid becomes an opening state after the reading processing is completed and before registration of the information by the registration apparatus is completed, the information that has been read so far.

2. The reading apparatus according to claim 1, wherein the reading module stops the reading processing in a case in which the state of the opening and closing lid becomes the opening state during the reading processing.

3. The reading apparatus according to claim 2, wherein the reading module resets, in a case in which the state of the opening and closing lid becomes the opening state during the reading processing, the information that has been read so far.

4. The reading apparatus according to claim 1, further comprising:
    a lock mechanism configured to lock the opening and closing lid in a closing state, wherein
    the reading module controls the lock mechanism to lock the opening and closing lid during the reading processing.

5. The reading apparatus according to claim 1, wherein the reading module stops the reading processing in a case in which the information cannot be read within a given period of time after the reading processing is started.

6. A reading method, including:
    acquiring an opening and closing state of an opening and closing lid;
    executing, in a case in which the acquired opening and closing state indicates a closing state of the opening and closing lid, a reading processing for reading information relating to a commodity from an RFID tag of the commodity housed in a casing through an antenna;
    outputting the read information to a registration apparatus; and
    resetting, in a case in which a state of the opening and closing lid becomes an opening state after the reading processing is completed and before registration of the information by the registration apparatus is completed, the information that has been read so far.

* * * * *